FERROELECTRIC STORAGE CIRCUIT

Filed May 10, 1956 3 Sheets-Sheet 1

INVENTOR
J. R. ANDERSON
BY [signature]
ATTORNEY

Oct. 6, 1959 J. R. ANDERSON 2,907,984

FERROELECTRIC STORAGE CIRCUIT

Filed May 10, 1956 3 Sheets-Sheet 2

INVENTOR
J. R. ANDERSON
BY [signature]
ATTORNEY

INVENTOR
J. R. ANDERSON
BY [signature]
ATTORNEY

United States Patent Office 2,907,984

Patented Oct. 6, 1959

2,907,984

FERROELECTRIC STORAGE CIRCUIT

John R. Anderson, Berkeley Heights, N.J., assignor to Bell Telephone Laboratories, Incorporated, New York, N.Y., a corporation of New York Application May 10, 1956, Serial No. 583,963

18 Claims. (Cl. 340—173)

This invention relates to electrical storage circuits and, more particularly, to such circuits employing ferroelectric capacitors.

Ferroelectric storage matrices in accordance with the prior art are subject to certain difficulties. For example, coincident voltage storage is employed which involves the concurrent application of pulses to a selected row and a selected column electrode. These pulses are therefore applied to unselected capacitors in the rows and columns of the matrix causing a disturbance of the remanent polarization of the unselected capacitors. If these store pulses are of excessive duration or magnitude, unselected capacitors are partially switched or, in extreme cases, completely switched by the disturbing pulses. Further, the information stored in these matrices is destroyed when it is sensed from the matrix. If it is desired to restore this same information in the matrix, extensive external circuitry, such as a monopulser for each bit of information, is required.

Accordingly, it is an object of this invention to provide improved storage circuits.

It is another object of this invention to provide improved ferroelectric matrices adapted to permit nondestructive readout.

It is another object of this invention to provide an improved ferroelectric matrix using a single pulse per row for storing information in the matrix.

It is a further object of this invention to provide a ferroelectric matrix with a simplified switching circuit to control the storage and sensing of information relative to the matrix.

Briefly, in accordance with aspects of this invention, a ferroelectric capacitor is serially connected to each of the column electrodes of the ferroelectric matrix. These serially connected capacitors comprise temporary storage mediums. Bilateral voltage responsive switches are serially connected between pulse sources and each of the row electrodes and between other pulse sources and the temporary storage capacitors.

Information is stored in the matrix by storing the information in the temporary storage capacitors and then shifting the stored information into a predetermined row of capacitors in the matrix. When it is desired to sense or read out the information relative to the matrix, this information is read out through the temporary storage capacitors, which operation stores the information in the temporary storage capacitors. If it is desired to restore this same information in the matrix, this operation is accomplished by applying another driving pulse to the predetermined row electrode of the matrix.

In accordance with another aspect of this invention, a ferroelectric shift register is combined with a ferroelectric matrix sequentially to control the storage of a self-checking binary code in the matrix. Individual stages of the shift register are connected through double anode saturation diodes to the row electrodes of the matrix and single anode diodes are connected between adjacent row electrodes. In this combined circuit all of the row capacitors of a given row in the matrix form one stage of the shift register and the shift register pulses are employed as driving pulses to store and read out the information relative to the matrix.

It is a feature of this invention to connect temporary storage ferroelectric capacitors to each of the column electrodes of a ferroelectric matrix and to store information in the matrix by first storing the desired information in the temporary storage capacitors and shifting this information into a predetermined row of the matrix by applying a single driving pulse to the predetermined row electrode of the matrix.

It is another feature of this invention to connect output circuits to the temporary storage capacitors at points remote from the matrix and to sense or read out the information from the ferroelectric matrix through these temporary storage capacitors, restoring the information previously stored in the matrix in the temporary storage capacitors.

It is another feature of this invention to connect a pulse source to the row electrodes of the matrix and, by means of a single pulse applied to the row electrode, to control the storage of information from the temporary memory capacitors to the row capacitors of the matrix.

It is still another feature of this invention to combine a ferroelectric shift register with a ferroelectric storage matrix by connecting individual external stages of the shift register to individual row electrodes of the matrix through saturation diodes. The capacitors in each row of the matrix therefore comprise stages of the shift register and information is transferred from temporary storage capacitors serially connected to each column electrode to the row capacitors in response to driving pulses applied to the external stages of the shift register.

A complete understanding of this invention and of these and various other features thereof may be gained from consideration of the following detailed description and the accompanying drawing in which.

Figure 1:
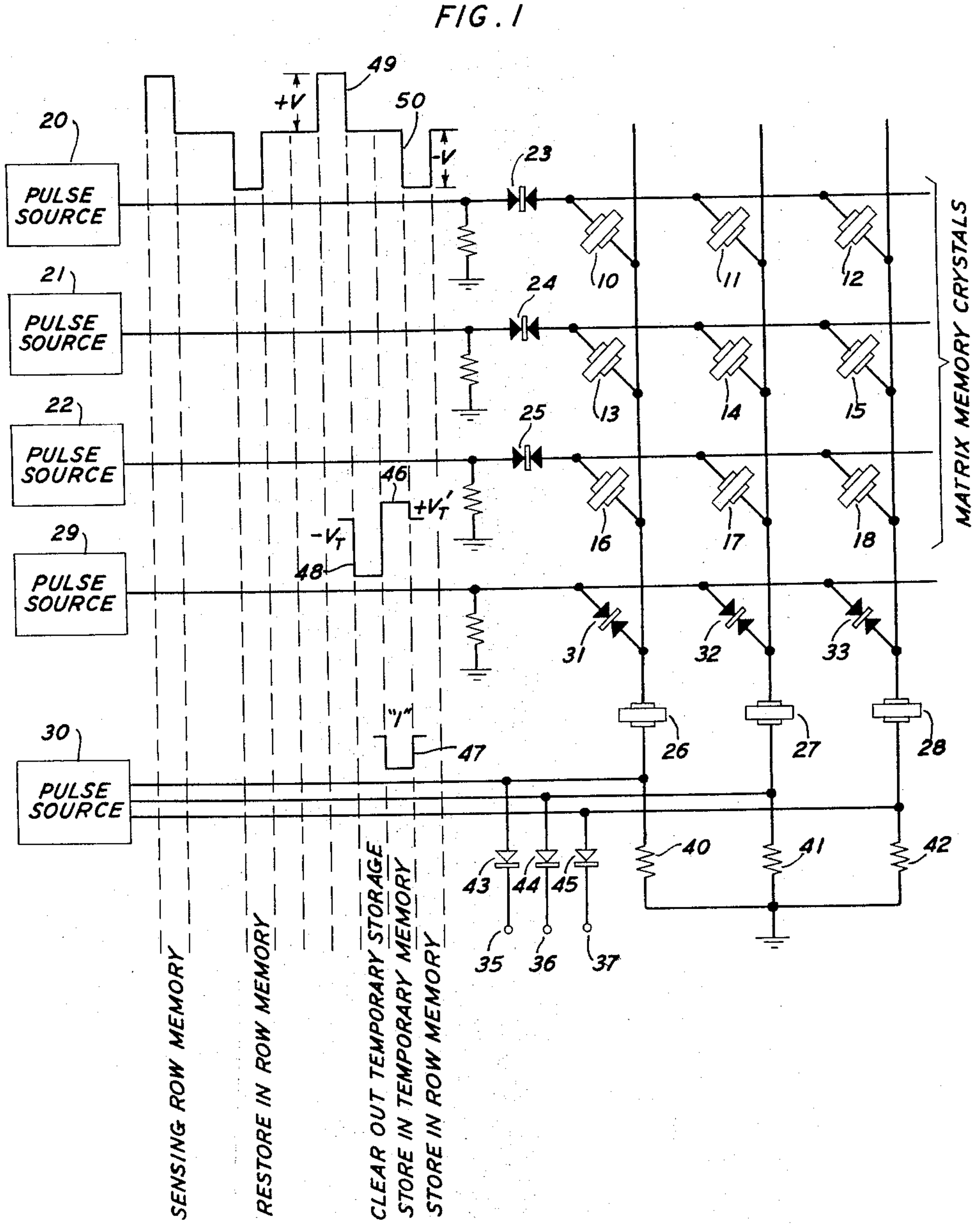
Fig. 1 is a schematic representation of one specific illustrative embodiment of a ferroelectric storage circuit in accordance with this invention.

Referring now to Fig. 1, there is depicted in accordance with one specific illustrative embodiment of this invention, a combination of ferroelectric matrix and temporary storage capacitors. Capacitors 10, 11 and 12 define a row of capacitors in the matrix while capacitors 10, 13 and 16 define a column of capacitors in the matrix. Pulse sources 20, 21 and 22 are connected to respective row electrodes of the matrix through individual pairs of saturation diodes 23, 24 and 25. The characteristics of these diodes are such that they are voltage responsive switches which offer a low resistance path to pulses of either polarity when their threshold voltage is exceeded. These characteristics are explained in detail in July 1954 edition of The Bell System Technical Journal, pages 827 through 834. Capacitors 26, 27 and 28 are temporary storage capacitors serially connected to respective column electrodes of the matrix. Pulse sources 29 and 30 are connected to opposite electrodes of temporary storage capacitors 26, 27 and 28. Double anode saturation diodes 31, 32 and 33 are serially connected between pulse source 29 and each of the temporary storage capacitors 26, 27 and 28, respectively. Output terminals 35, 36 and 37 are connected through respective diodes 43, 44 and 45 to points intermediate the temporary storage capacitors and their associated output load resistors 40, 41 and 42.

The principles involved in switching a pair of serially connected ferroelectric capacitors are disclosed in my Patent 2,695,396, issued November 23, 1954. Two serially connected ferroelectric capacitors polarized in opposite directions will not be switched by pulses of either polarity applied across the series combination. However, if both capacitors are polarized in the same direction, they will be switched first in one direction by pulses of one polarity and then in the opposite direction by pulses of the other polarity, it being assumed that in each instance the pulses are applied in the polarity which opposes the remanent polarization of the capacitors.

The basic operation of the storage circuit of Fig. 1 comprises the steps of (1) storing information pulses in the temporary storage capacitors 26, 27 and 28 by means of concurrent complementary pulses from sources 29 and 30, (2) shifting this information into a predetermined selected row of capacitors by means of a negative pulse applied to the row electrode from the pulse source connected to that row electrode, (3) sensing the information relative to a row of capacitors in the matrix through the temporary storage capacitors by means of a positive pulse from the pulse source connected to the row electrode, and (4) restoring the information in the previously sensed row of capacitors from the temporary storage capacitors by means of a negative pulse from the pulse source connected to that row electrode. When the information is no longer needed to be stored in the matrix, this information is sensed from the row of matrix capacitors into the temporary storage capacitors and cleared from these temporary storage capacitors by means of a negative pulse applied directly across the temporary storage capacitors from source 29.

Figure 3A:
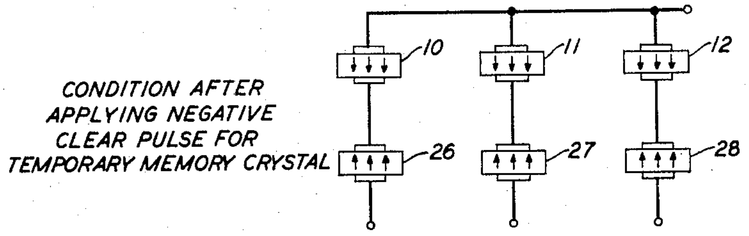
Figs. 3A through 3D depict the polarization of the matrix and temporary storage capacitors during the storing, sensing, clearing and restoring cycle.
Figure 3B:
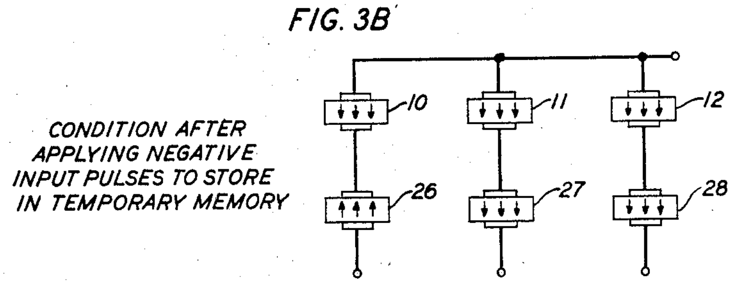
Figure 3C:
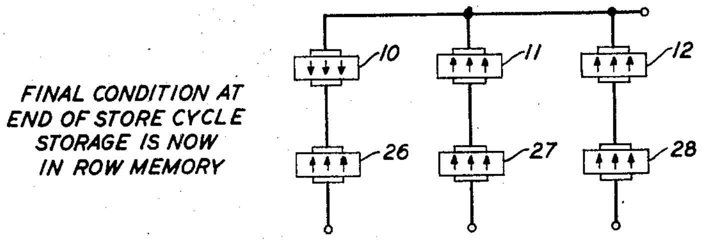
Figure 3D:
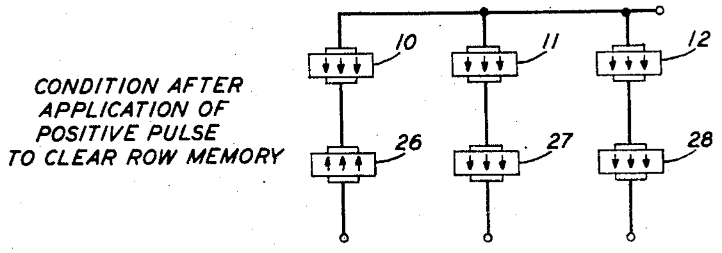

Assume for the purposes of explanation of the operation of this circuit that it is desired to store a "word" or group of digits 0–1–1 in capacitors 10, 11 and 12, respectively. Also assume that the remanent polarization of capacitors 10, 11 and 12 is initially in a downward direction while the remanent polarization in each of the temporary storage capacitors 26, 27 and 28 is initially in an upward direction, as depicted in Fig. 3A. A positive pulse 46 is applied from source 29 through double anode diodes 31, 32 and 33 to each of the temporary storage capacitors. Simultaneously, a complementary negative pulse 47 is applied to those temporary capacitors in which digits are to be stored, namely, capacitors 27 and 28. These concurrent pulses reverse the remanent polarization of capacitors 27 and 28, as depicted in Fig. 3B. A negative pulse is applied from source 20 through double anode diode 23 to its associated row electrode, reversing the remanent polarization of capacitors 11, 27, 12 and 28, as depicted in Fig. 3C. These pairs of capacitors are reversed because they are polarized in the same direction. Capacitors 10 and 26 are not reversed in response to pulses of either polarity on the row electrode as they are polarized in opposite directions. A subsequent positive pulse from source 20 again reverses the remanent polarization of capacitors 11, 27, 12 and 28, as depicted in Fig. 3D, causing voltage pulses to be developed across resistors 41 and 42 and delivered to terminals 36 and 37. Thus the "word" 0–1–1 which was previously stored in capacitors 10, 11 and 12 has been effectively read out of the matrix and is now stored in temporary storage capacitors 26, 27 and 28. This "word" may now be restored in capacitors 10, 11 and 12 by a subsequent driving pulse of negative polarity from source 20 as the remanent polarizations indicated in Fig. 3D are identical with those of Fig. 3B. If, however, it is desired to clear this information from the temporary storage capacitors, a negative pulse 48 is applied from source 29, which pulse is of sufficient magnitude to reverse the remanent polarization of capacitors 27 and 28. All of the capacitors are now polarized in their initial directions and the operation cycle is ready to be repeated. It is understood that pulse sources 29 and 30 will be turned off during readout and restorage relative to the matrix.

The saturation voltage of diodes 23, 24 and 25 is advantageously greater than one-half the voltage of the driving pulses 49 and 50. Also, the saturation voltages of saturation diodes 31, 32 and 33 are approximately equal to the magnitude of pulse 46 where pulse 46 is greater than the required driving voltage across the ferroelectric capacitors. Further, the breakdown voltage of diodes 23, 24 and 25 plus the breakdown voltage of diodes 31, 32 and 33 are greater than the voltage of pulse 48 in order to prevent the disturbance of unselected capacitors in the matrix during the clearing operation of the temporary storage capacitors.

While the sequence of pulses applied to the storage circuit of Fig. 1 is indicated in this figure, it is possible to modify this sequence and reduce the time required for a complete cycle of operation. This reduction may be achieved by making pulse 48 coincident with pulse 49 during the storing cycle, thus eliminating one period of delay between the driving pulses. This reduction in delay would reduce the requirements on synchronizing circuitry to control the pulse sources.

Figure 2:
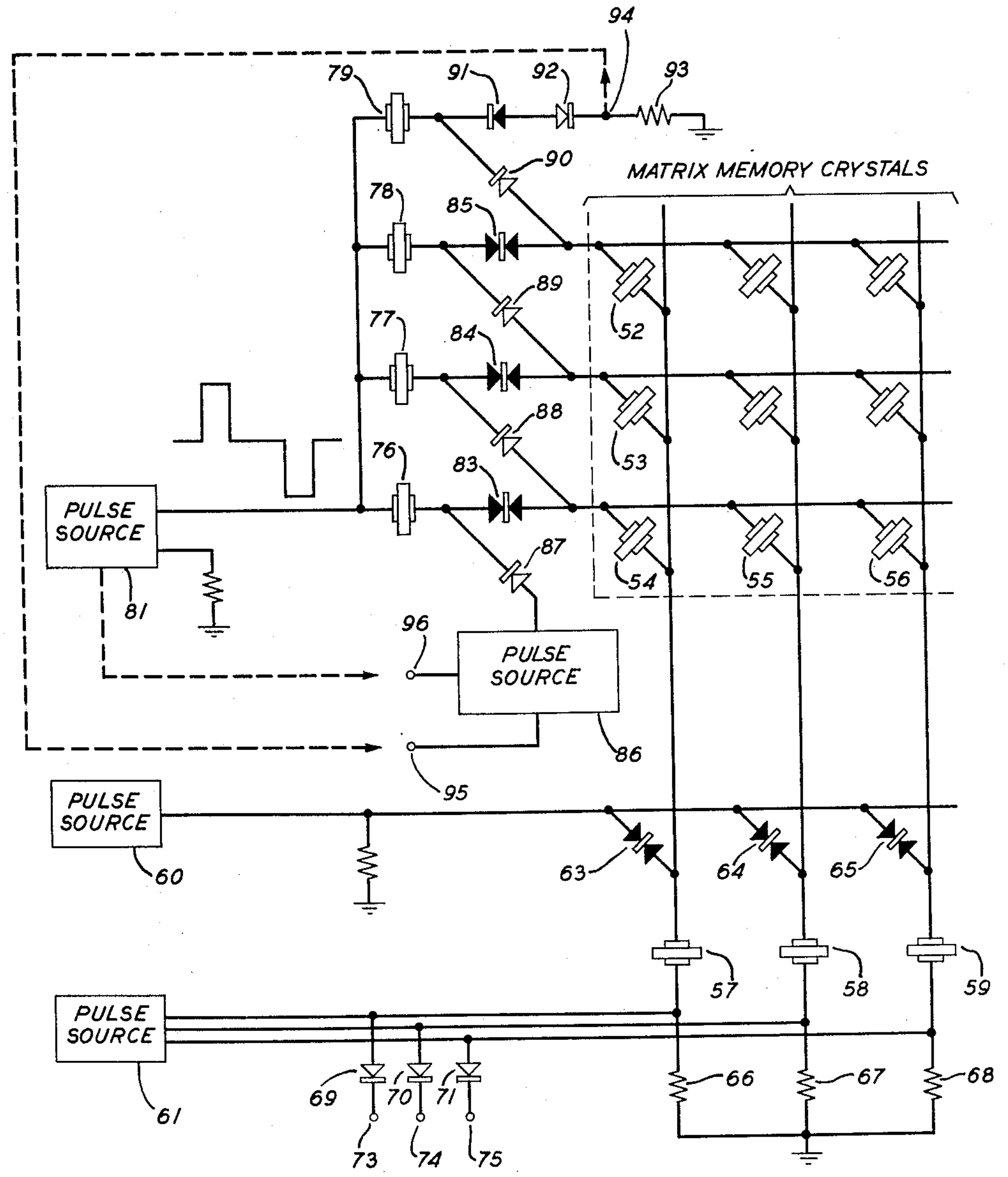
Fig. 2 is a schematic representation of another specific illustrative embodiment of this invention.

Referring now to Fig. 2, there is depicted another specific embodiment of this invention in which capacitors 76, 77, 78 and 79 comprise stages of a shift register external to the matrix. Capacitors 54, 55 and 56 comprise the row capacitors of one row of the matrix while capacitors 52, 53 and 54 comprise the capacitors of a column of the matrix. Between the external capacitors of the shift register and the rows of capacitors of the matrix, which effectively form stages of the shift register, are saturation diodes or bilateral voltage responsive switching devices 83, 84 and 85. Each row electrode of the matrix and the subsequent external stage of the shift register are connected together by diodes 88, 89 and 90. The pulse storage circuit for the first stage of the shift register includes pulse source 86 and its connecting diode 87. Pulse source 81 is connected to all the external stages of the shift register and supplies the driving pulses for the shift register. The last stage of the shift register includes diodes 91, 92 and resistor 93. In order to return the initial stored pulse to the shift register, output terminal 94 may be connected to the input terminal 95 of pulse source 86 or source 81 may be connected to terminal 96. If this last-mentioned connection is made, the pulse source 86 may be a count-down circuit including ferroelectric capacitors as disclosed in R. M. Wolfe Patent 2,854,590, issued September 30, 1958. Temporary storage capacitors 57, 58 and 59 are connected to individual column electrodes of the matrix. Pulse sources 60 and 61 are connected across these temporary storage capacitors through double anode saturation diodes 63, 64 and 65. Output load resistors 66, 67 and 68 are serially connected between the temporary storage capacitors and a source of reference potential. Output pulses from these individual load resistors are delivered through individual diodes 69, 70 and 71 to their respective output terminals 73, 74 and 75.

The storage circuit of Fig. 2 is particularly adapted to store a self-checking binary code. By self-checking binary code is meant one in which the same number of digits are to be stored in each row of capacitors in the matrix. The operation of the combination of shift register and matrix from a shifting standpoint is the same as that of the shift register disclosed in my Patent 2,876,435, issued March 3, 1959. A pulse is first stored in capacitor 76 by the simultaneous application of complementary pulses from sources 81 and 86. In response to the next pulse from source 81, which is of opposite polarity to the previous pulse from source 81, this stored pulse is transferred from capacitor 76 through saturation diodes 83 to the associated row electrode of the matrix. On the next subsequent pulse from source 81, the previously stored pulse is transferred through diode 88 to capacitor 77. The next pulse from source 81 transfers this pulse through saturation diodes 84 to its associated matrix row electrode. Subsequent pulses from source 81 transfer the stored pulse to capacitor 78, then to its associated row electrode and finally out of the matrix into capacitor 79. The transfer of these pulses from the external stages of the shift register to the row electrodes of the matrix and then from the row electrodes to the next subsequent external stage of the shift register is employed as driving pulses to control the transfer of information between temporary storage capacitors 57, 58, 59 and the matrix in a manner similar to the pulses applied to the row electrodes in Fig. 1 except that in Fig. 2 the transfer of information to and from the matrix is on a sequential basis. The transfer of a positive pulse from capacitor 76 to its associated row electrode acts to sense or read out the pulses stored in row capacitors 54, 55 and 56. The transfer of this pulse from the row capacitors through diode 88 to capacitor 77 acts as a restore pulse for capacitors 54, 55 and 56, restoring the information from the temporary storage capacitors to the matrix row capacitors. The storage of information in the temporary storage capacitors and the transfer of this stored information into the matrix with the subsequent readout of the information through the temporary storage capacitors is otherwise identical with the operation of Fig. 1.

Advantageously, in accordance with this embodiment, a sequential matrix switch is obtained by the addition of only one ferroelectric capacitor and one diode per row electrode to the circuit depicted in Fig. 1. The serially connected double anode saturation diodes 83, 84, and 85 thus isolate the several stages of the shift register as well as prevent disturbing pulses from being applied to unselected rows of capacitors in the same manner as in the matrix shown in Fig. 1.

It is to be understood that the above-described arrangements are illustrative of the application of the principles of the invention. Numerous other arrangements may be devised by those skilled in the art without departing from the spirit and scope of the invention.

What is claimed is:

1. A ferroelectric storage circuit comprising a ferroelectric matrix having row and column electrodes, a temporary storage circuit including a plurality of temporary storage ferroelectric capacitors, each of said column electrodes being in series with only one of said temporary storage ferroelectric capacitors, output means connected to each of said temporary storage capacitors remote from said matrix, first pulse means connected to each of said row electrodes and second pulse means connected to said temporary storage capacitors for storing and clearing information relative to said temporary storage capacitors.

2. A ferroelectric storage circuit in accordance with claim 1 wherein said output means includes individual resistors connected between each of said temporary storage capacitors and a source of reference potential and wherein said second pulse means includes a first and a second pulse source each connected to one electrode of said temporary storage capacitors.

3. A ferroelectric storage circuit in accordance with claim 1 wherein said first pulse means includes means for supplying driving pulses of opposite polarity to each of said row electrodes wherein a pulse of one polarity applied to one row electrode transfers the information from said temporary storage capacitors to the matrix capacitors of said one row electrode and a pulse of the other polarity applied to said one row electrode transfers information from the matrix capacitors of said one row electrode to said temporary storage capacitors.

4. A ferroelectric storage circuit in accordance with claim 1 further including a plurality of double anode saturation diodes each serially connected between said second pulse means and one of said column electrodes.

5. A ferroelectric storage circuit in accordance with claim 1 further including a plurality of double anode saturation diodes each serially connected between said first pulse means and one of said row electrodes.

6. A ferroelectric storage circuit including a first group of ferroelectric capacitors connected in the form of a matrix having row and column electrodes, a second group of ferroelectric capacitors each connected to one of said row electrodes, a first plurality of bilateral voltage responsive means each serially connected between one of said second group capacitors and one of said row electrodes, pulse means for storing a pulse in one of said second group capacitors including means for applying pulses to each of said second group capacitors, diode means connecting each row electrode to the second group capacitor associated with the next adjacent row electrode, means including said pulse means for transferring pulses to said matrix, and output means connected to said column electrodes.

7. A ferroelectric storage circuit in accordance with claim 6 wherein said means for transferring pulses to said matrix includes a third group of ferroelectric capacitors each serially connected between one of said column electrodes and said output means.

8. A ferroelectric storage circuit in accordance with claim 7 further including second pulse means connected to said third group capacitors for storing and clearing information relative to said third group capacitors.

9. A ferroelectric storage circuit in accordance with claim 8 further including a second plurality of bilateral voltage responsive switching means each serially connected between said second pulse means and one of said column electrodes.

10. A ferroelectric storage circuit in accordance with claim 9 wherein each of said bilateral voltage responsive switching means is a pair of oppositely poled serially connected saturation diodes.

11. A ferroelectric storage circuit in accordance with claim 9 wherein the breakdown voltage of said second plurality of voltage responsive switching means is less than the breakdown voltage of said first plurality of bilateral voltage responsive switching means.

12. A ferroelectric storage circuit in accordance with claim 11 wherein the breakdown voltage of said first plurality of bilateral voltage responsive means is at least half as large as the magnitude of the pulses applied to said second group capacitors.

13. A ferroelectric nondestructive storage circuit including a first group of ferroelectric capacitors connected together to form a matrix having row and column electrodes, a group of temporary storage ferroelectric capacitors, each of said column electrodes connected in series with only one of said temporary storage ferroelectric capacitors, pulse means connected across each of said temporary storage ferroelectric capacitors and adapted selectively to store and clear information relative to said temporary storage capacitors, a first plurality of bilateral voltage responsive switching means each serially connected between said pulse means and one of said column electrodes, driving pulse means connected to each of said row electrodes and a second plurality of bilateral voltage responsive switching means each serially connected between said driving pulse means and one of said row electrodes.

14. A ferroelectric storage nondestructive circuit in accordance with claim 13 wherein the breakdown voltage of said second plurality of bilateral voltage responsive switching means is less than the breakdown voltage of said first-mentioned bilateral voltage responsive switching means.

15. A ferroelectric nondestructive storage circuit in accordance with claim 14 wherein the breakdown voltage of said second-mentioned bilateral voltage responsive switching means is at least half as large as the magnitude of the pulses from said driving pulse means.

16. A ferroelectric nondestructive storage circuit in accordance with claim 15 wherein the sum of the breakdown voltage of said first plurality of bilateral voltage responsive switching means and the breakdown voltage of said second plurality of bilateral voltage responsive switching means is greater than the magnitude of the store pulses from said first-mentioned pulse means.

17. A ferroelectric storage circuit comprising a ferroelectric storage matrix having row and column electrodes and means for storing information in and non-destructively reading information out of said matrix, said means comprising a temporary storage ferroelectric capacitor connected to each of said column electrodes and means for applying pulses to said ferroelectric capacitors and said row electrodes.

18. A ferroelectric storage circuit comprising a ferroelectric storage matrix having row and column electrodes, means for storing information in and non-destructively reading information out of said matrix comprising a plurality of temporary storage ferroelectric capacitors each connected to a corresponding one of said column electrodes, and means for sequentially pulsing said row electrodes, said last-mentioned means comprising a plurality of distinct ferroelectric capacitors each connected to one of said row electrodes.

References Cited in the file of this patent

UNITED STATES PATENTS

| | | |
|---|---|---|
| 2,695,396 | Anderson | Nov. 23, 1954 |
| 2,695,398 | Anderson | Nov. 23, 1954 |
| 2,785,390 | Rajchman | Mar. 12, 1957 |